United States Patent
Kamata et al.

(10) Patent No.: US 8,941,355 B2
(45) Date of Patent: Jan. 27, 2015

(54) CELL BALANCE CONTROL DEVICE THAT PREVENTS TEMPERATURE INCREASE OF BYPASS CIRCUIT SUBSTRATE

(75) Inventors: Seiji Kamata, Utsunomiya (JP); Eishin Matsumoto, Shioya-gun (JP)

(73) Assignee: Keihin Corporation (JP)

( * ) Notice: Subject to any disclaimer, the term of this patent is extended or adjusted under 35 U.S.C. 154(b) by 431 days.

(21) Appl. No.: 13/304,953

(22) Filed: Nov. 28, 2011

(65) Prior Publication Data
US 2012/0133330 A1 May 31, 2012

(30) Foreign Application Priority Data
Nov. 26, 2010 (JP) .................................. 2010-264210

(51) Int. Cl.
*H01M 10/46* (2006.01)
*H02J 7/00* (2006.01)
(52) U.S. Cl.
CPC ............ *H02J 7/0016* (2013.01); *Y02T 10/7055* (2013.01)
USPC ....................................................... 320/118
(58) Field of Classification Search
USPC ............................ 320/107, 116, 118, 122, 150
See application file for complete search history.

(56) References Cited

U.S. PATENT DOCUMENTS

| 6,025,696 A * | 2/2000 | Lenhart et al. ................. 320/122 |
| 2009/0079390 A1* | 3/2009 | Choi et al. ..................... 320/122 |

FOREIGN PATENT DOCUMENTS

| JP | 8-19188 A | 1/1996 |
| JP | 2006115640 A | 4/2006 |
| JP | 2007288886 A | 11/2007 |
| JP | 2008-21589 A | 1/2008 |
| JP | 2009017630 A | 1/2009 |
| JP | 2010246225 A | 10/2010 |

OTHER PUBLICATIONS

Office Action For The Japanese Patent No. 2010-264210, Mailed On Apr. 25, 2014. English Translation Attached.

* cited by examiner

*Primary Examiner* — Edward Tso
(74) *Attorney, Agent, or Firm* — Cantor Colburn LLP

(57) ABSTRACT

What is provided is a cell balance control device including: a bypass circuit including a direct circuit with a bypass resistance and a switching element, the bypass circuit being connected in parallel to each of a plurality of cells included in a battery; a cell voltage detection unit detecting a cell voltage of each of the plurality of cells; a temperature detection unit detecting a temperature of a substrate on which the bypass circuit is mounted; and a control unit controlling and computing a duty ratio of the switching element based on a value detected by the temperature detection unit and a cell voltage of a discharge-needed cell obtained by the cell voltage detection unit.

6 Claims, 3 Drawing Sheets

CELL BALANCE CONTROL DEVICE THAT PREVENTS TEMPERATURE INCREASE OF BYPASS CIRCUIT SUBSTRATE

The present application claims priority on Japanese Patent Application No. 2010-264210, filed Nov. 26, 2010, the content of which is incorporated herein by reference.

BACKGROUND OF THE INVENTION

1. Field of the Invention

The present invention relates to a cell balance control device which equalizes a cell voltage of a battery cell.

2. Description of the Related Art

It is well known that vehicles such as electric cars and hybrid cars are mounted with a motor and a high-pressure, high-capacity battery. The motor acts as a power source. The high-pressure, high-capacity battery supplies electric power to this motor. This battery is structured by connecting a plurality of battery cells in series. The battery cell includes a lithium-ion battery, a hydrogen nickel battery, and the like. Conventionally, in order to maintain the functionality of a battery, a cell balance control is performed by monitoring a cell voltage of each battery cell and equalizing each cell voltage.

Japanese Unexamined Patent Application, First Publication No. H8-19188 (hereinafter referred to as "Patent Document 1") discloses a technology which connects a direct circuit of a resistance and a switching element with each cell in series as a bypass circuit. The lowest cell voltage is compared with another cell voltage. If this difference in voltage exceeds a first predetermined value, the switching element of the cell is turned on. In this way, a conduction is made in the bypass circuit (i.e., the cell is discharged). When the difference in voltage becomes less than or equal to a second predetermined value, which is smaller than the first predetermined value, the switching element is turned off. In this way, the bypass circuit is shut off. Thus, each cell voltage is equalized.

Japanese Unexamined Patent Application, First Publication No. 2008-21589 (hereinafter referred to as "Patent Document 2") discloses a technology which is similar to the technology disclosed in Patent Document 1. According to Patent Document 2, a bypass circuit is connected in parallel to each cell. A predetermined capacity adjusting current value is altered based on a capacity adjusting ability enhancement request degree which is set according to a condition that the battery is in (for example, a condition in which a cell voltage is distributed, a proportion of a time during which a battery is used, and a capacity degradation coefficient). A duty of the switching element is controlled so that the bypass circuit is supplied with a discharge current corresponding to the predetermined capacity adjusting current value. In this way, each cell voltage is equalized.

As described above, according to conventional technology, a cell balance was controlled based on, for example, a difference between cell voltages, a condition in which a cell voltage is distributed, a proportion of a time during which a battery is used, and a capacity degradation coefficient. Meanwhile, when a cell balance is controlled, a discharge current runs through a bypass circuit. As a result, the bypass circuit heats up. This leads to an increase in the temperature of a circuit substrate. A bypass circuit, a cell voltage detection circuit, a control circuit (control IC), and the like are mounted on the circuit substrate. In addition to the temperature of the circuit substrate increasing, the circuit element might be destroyed, and malfunctions might occur.

Taking into consideration that the temperature of the circuit substrate might increase, a cell balance control is not performed in conventional technology. A switching element of a plurality of cells might be turned on simultaneously. When such an instance occurs frequently, the temperature of the circuit substrate increases. Further, the circuit element might be destroyed and/or a malfunction might occur. In this way, it might become difficult to properly perform a cell balance control.

The present invention is made according to these considerations. An object of the present invention is to provide a cell balance control device which can prevent malfunctions and destruction of the circuit element due to an increase in the temperature of the substrate, thereby maintaining an appropriate cell balance control.

SUMMARY OF THE INVENTION

In order to achieve the above object, the present invention employs the following.

[1] Namely, a cell balance control device according to an aspect of the present invention includes a bypass circuit including a direct circuit with a bypass resistance and a switching element, the bypass circuit being connected in parallel to each of a plurality of cells included in a battery; a cell voltage detection unit detecting a cell voltage of each of the plurality of cells; a temperature detection unit detecting a temperature of a substrate on which the bypass circuit is mounted; and a control unit controlling and computing a duty ratio of the switching element based on a value detected by the temperature detection unit and a cell voltage of a discharge-needed cell obtained by the cell voltage detection unit.

[2] In addition, the above cell balance control device according to [1] may be configured as follows: the control unit includes a discharge predetermined electric power calculation unit, a discharge-needed cell discharge electric power calculation unit, and a duty control unit. Here, based on the value detected by the temperature detection unit, the discharge predetermined electric power calculation unit computes a discharge predetermined electric power necessary for increasing the temperature of the substrate to a maximum allowable temperature. Based on the cell voltage of the discharge-needed cell, the discharge-needed cell discharge electric power calculation unit computes a discharge-needed cell discharge electric power consumed by a bypass circuit connected to the discharge-needed cell. Further, the duty control unit computes a duty ratio based on the discharge predetermined electric power and the discharge-needed cell discharge electric power, and uses this duty ratio to perform a duty control of the switching element of the bypass circuit connected to the discharge-needed cell.

[3] In addition, the above cell balance control device according to [2] may be configured as follows: the discharge predetermined electric power calculation unit computes the discharge predetermined electric power based on a following equation (1).

$$W1 = (Tmax - Ta)/Rth \qquad (1)$$

Here, W1 represents the discharge predetermined electric power, Tmax represents the maximum allowable temperature, Ta represents the temperature of the substrate, and Rth represents a thermal resistance of the substrate.

[4] In addition, the above cell balance control device according to [2] or [3] may be configured as follows: the discharge-needed cell discharge electric power calculation unit computes the discharge-needed cell discharge electric power based on a following equation (2).

$$W2 = \Sigma(Vi^2/r) \qquad (2).$$

Here, W2 represents the discharge-needed cell discharge electric power, Vi represents the cell voltage of the discharge-needed cell, i represents an identification number of the discharge-needed cell, and r represents a resistance of the bypass circuit.

[5] In addition, the above cell balance control device according to any one of [2], [3], or [4] may be configured as follows: the duty control unit computes the duty ratio based on a following equation (3).

$$Dy = (W1/W2) \times 100 \quad (3)$$

Here, Dy represents the duty ratio, W1 represents the discharge predetermined electric power, and W2 represents the discharge-needed cell discharge electric power.

[6] In addition, the above cell balance control device according to any one of [1], [2], [3], [4], or [5] may be configured as follows: the control unit transmits to an upper level control device, each of the cell voltage of the plurality of cells obtained by the cell voltage detection unit. The control unit also receives from the upper level control device, an identification result of the discharge-needed cell.

EFFECT OF THE INVENTION

According to the present invention, the temperature of the substrate may be restrained to be less than or equal to the maximum allowable temperature while performing a cell balance control. Therefore, it is possible to prevent malfunctions and destructions of the circuit element occurring due to an increase in the temperature of the substrate. Therefore, it is possible to maintain an appropriate cell balance control.

DETAILED DESCRIPTION OF THE PREFERRED EMBODIMENTS

Figure 1:
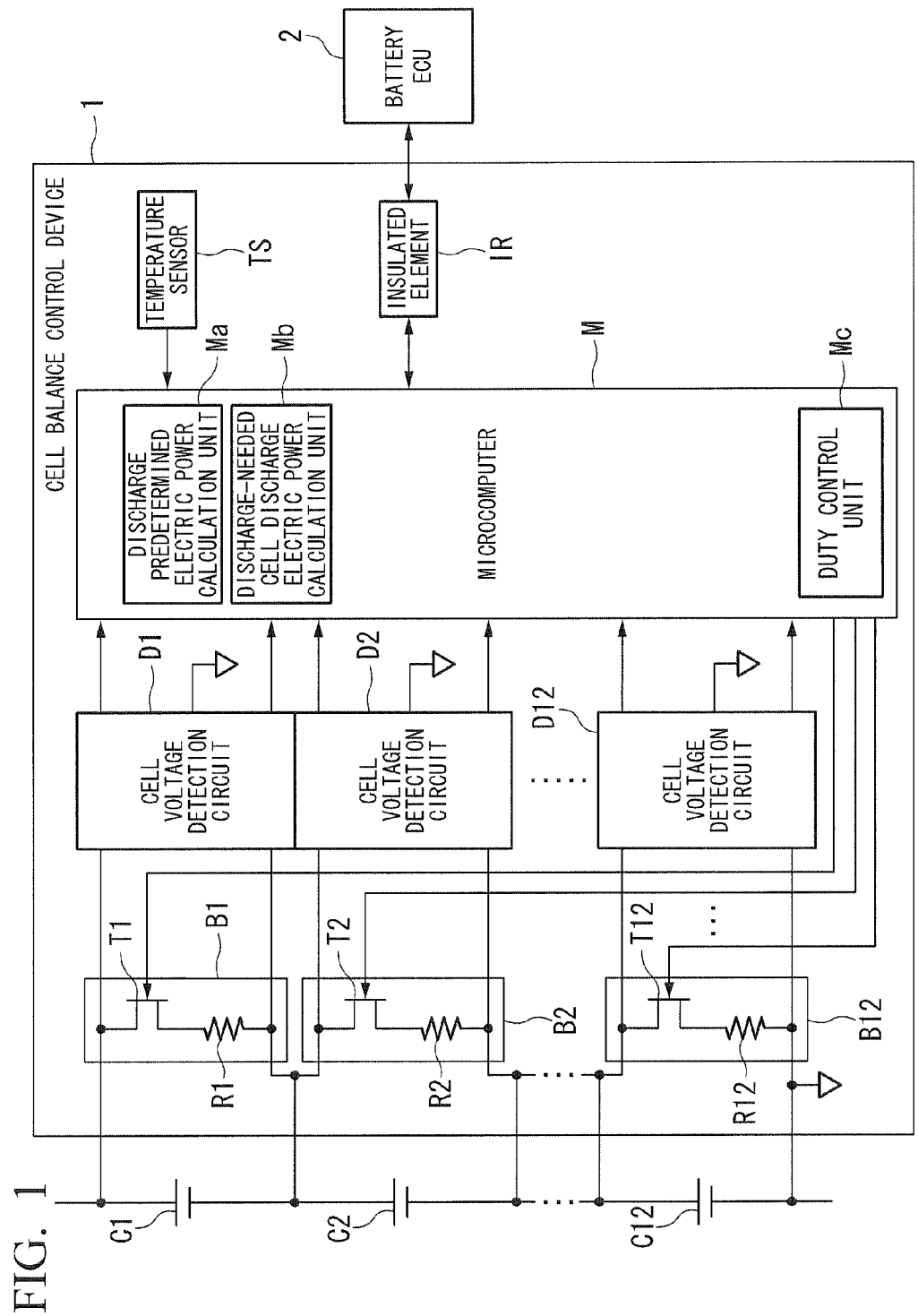
FIG. 1 is a schematic diagram of a structure of a cell balance control device according to an embodiment of the present invention.

Hereinafter, an embodiment of the present invention is described with reference to the attached diagrams. FIG. 1 is a schematic diagram of a structure of a cell balance control device 1 according to the present embodiment. As shown in FIG. 1, the cell balance control device 1 performs a cell balance control to equalize the cell voltage of twelve cells C1 to C12 included in the battery. The cell balance control device 1 includes twelve bypass circuits B1 to B12, twelve cell voltage detection circuits D1 to D12 (cell voltage detection unit), a temperature sensor TS (temperature detection unit), a microcomputer M (control unit), and an insulated element IR.

Each of the bypass circuits B1 to B12 includes a direct circuit between a bypass resistance and a switching element such as a transistor. Each of the bypass circuits B1 to B12 is respectively connected in parallel to cells C1 to C12. Incidentally, in FIG. 1, the reference numerals of the bypass resistance embedded in each of the bypass circuits B1 to B12 is respectively R1 to R12. The reference numerals of the switching elements are T1 to T12.

The cell voltage detection circuits D1 to D12 are respectively connected in parallel to the cells C1 to C12. Each of the cell voltage detection circuits D1 to D12 detects the electric voltage between cell terminals (cell voltage) connected to the cell voltage detection circuit. The cell voltage detection circuit outputs to the microcomputer M, the value of the detected voltage. Incidentally, a condenser is embedded in each of the cell voltage detection circuits D1 to D12. The condenser embedded in each of the cell voltage detection circuits D1 to D12 is respectively connected in parallel to the cells C1 to C12. In other words, the voltage between the terminals of each condenser is outputted to the microcomputer M as the cell voltage of each of the cells C1 to C12.

The temperature sensor TS is a thermostat mounted on the circuit substrate (not diagrammed) along with the bypass circuits B1 to B12, the cell voltage detection circuits D1 to D12, the insulated element IR, and the microcomputer M. The temperature sensor TS detects the temperature of the circuit substrate. The temperature sensor TS then outputs to the microcomputer M, a signal indicating the value that was detected. Incidentally, there is no particular limitation on the position on the circuit substrate at which the temperature sensor TS is mounted. It is preferable that the temperature sensor TS be mounted near a cell voltage detection circuit D1 to D12 or a microcomputer M which is considered prone to malfunctions or destructions of the circuit element due to an increase in the temperature of the substrate.

The microcomputer M is connected to the battery ECU (Electronic Control Unit) 2 via the insulated element IR so that the microcomputer M may communicate with the battery ECU 2. The ECU 2 is an upper level control device. The cell voltage of each of the cells C1 to C12 are obtained from the cell voltage detection circuit D1 to D12. The microcomputer M transmits the value of this cell voltage to the battery ECU 2. The battery ECU 2 monitors the change in the cell voltage of each of the cells C1 to C12 based on the value of the cell voltage of each of the cells C1 to C12 received from the microcomputer M. When the battery ECU 2 discovers a cell having a high cell voltage compared to other cells, the battery ECU 2 identifies that cell as a cell that needs a discharge (a discharge-needed cell). The battery ECU 2 sends the identification result to the microcomputer M.

When the microcomputer M receives the identification result of the discharge-needed cell from the battery ECU 2, the microcomputer performs a control by computing a duty ratio of the switching element based on a value detected by the temperature sensor TS (temperature of the substrate) and the cell voltage of the discharge-needed cell obtained from the cell voltage detection circuit D1 to D12.

In particular, this microcomputer M performs a duty control of the switching element of the bypass circuit connected to the discharge-needed cell so that the temperature Ta of the substrate does not exceed the maximum allowable temperature Tmax. As a working unit to carry out such a duty control, the microcomputer M has a discharge predetermined electric power calculation unit Ma, a discharge-needed cell discharge electric power calculation unit Mb, and a duty control unit Mc.

The discharge predetermined electric power calculation unit Ma computes the discharge predetermined electric power W1 that is necessary for increasing the temperature Ta of the substrate to the maximum allowable temperature Tmax based on the temperature Ta of the substrate which was detected by the temperature sensor TS. The discharge-needed cell discharge electric power calculation unit Mb computes the discharge-needed cell discharge electric power W2 consumed by the bypass circuit connected to the discharge-needed cell based on the cell voltage of the discharge-needed cell. The duty control unit Mc computes a duty ratio Dy based on the discharge predetermined electric power W1 and the discharge-needed cell discharge electric power W2. In this way, the duty control unit Mc performs a duty control of the switching element of the bypass circuit connected to the discharge-needed cell with the computed duty ratio Dy.

Figure 2:
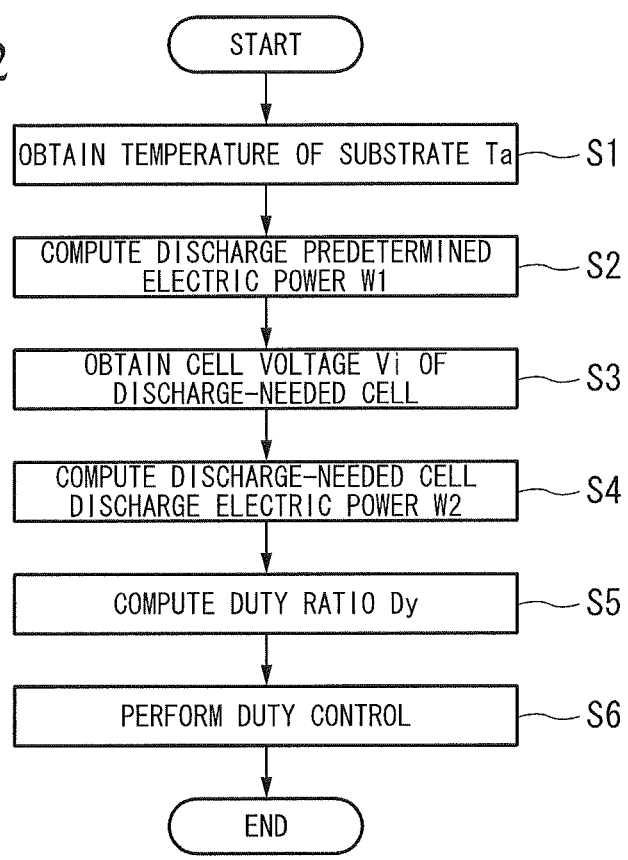
FIG. 2 is a flowchart showing a cell balance control performed by a microcomputer.

Next, an operation of the cell balance control device 1 configured as described above is described. FIG. 2 is a flowchart showing an operation sequence of a cell balance control carried out by the microcomputer M. Incidentally, the microcomputer M transmits to the battery ECU 2, a cell voltage of each of the cells C1 to C12 obtained by the cell voltage detection circuit D1 to D12 at a constant period. The operation shown in FIG. 2 is started when an identification result of a discharge-needed cell is received from the battery ECU 2.

As shown in FIG. 2, when the microcomputer M receives the identification result of the discharge-needed cell from the battery ECU 2, the microcomputer M obtains a substrate temperature Ta from the temperature sensor TS (step S1). Then, the discharge predetermined electric power calculation unit Ma of the microcomputer M computes the discharge predetermined electric power W1 (step S2) based on the following equation <1> including the substrate temperature Ta (° C.), the maximum allowable temperature Tmax (° C.) of the circuit substrate, and the thermal resistance Rth (° C./W) of the circuit substrate. Incidentally, in the following equation <1>, the maximum allowable temperature Tmax and the thermal resistance Rth are inherent values that are set in advance for the microcomputer M.

$$W1 = (Tmax - Ta)/Rth \qquad <1>$$

Next, from among the cell voltage values of each of the cells C1 to C12, the discharge-needed cell discharge electric power calculation unit Mb of the microcomputer M obtains the cell voltage of the discharge-needed cell (step S3) identified by the battery ECU 2. Then, the discharge-needed cell discharge electric power calculation unit Mb computes the discharge-needed cell discharge electric power W2 (step S4) according to the following equation <2> including the resistance value r of the bypass resistance R1 to R12 provided with each of the bypass circuits B1 to B12 and the cell voltage Vi of the discharge-needed cell. Here, i is the identification number of the discharge-needed cell.

$$W2 = \Sigma(Vi^2/r) \qquad <2>$$

For example, in step S4 above, when the cells C1, C5, and C10 are identified as discharge-needed cells, the discharge-needed cell discharge electric power calculation unit Mb of the microcomputer M computes the discharge-needed cell discharge electric power W2 by entering the cell voltage values V1, V5, and V10 of the discharge needed cells C1, C5, and C10 into the above equation <2>, thereby computing $(V1^2/r) + (V5^2/r) + (V10^2/r)$.

The discharge predetermined electric power W1 obtained in step S2 above is an electric power necessary for increasing the substrate temperature Ta to the maximum allowable temperature Tmax. The discharge-needed cell discharge electric power W2 obtained in step S4 above is a total amount of the discharged electric power consumed by the bypass circuit when a duty control is performed on the switching element of the bypass circuit connected to the discharge-needed cell with a duty ratio of 100% (i.e., at the time of a full-on). Here, when the discharge-needed cell discharge electric power W2 is less than or equal to the discharge predetermined electric power W1, the substrate temperature Ta will not exceed the maximum allowable temperature Tmax even when the switching element of the bypass circuit connected to the discharge-needed cell undergoes a duty control with a duty ratio of 100%.

Meanwhile, when the discharge-needed cell discharge electric power W2 exceeds the discharge predetermined electric power W1, the substrate temperature Ta will not exceed the maximum allowable temperature Tmax if the discharge-needed cell discharge electric power W2 is reduced to the discharge predetermined electric power W1. In other words, the substrate temperature Ta will not exceed the maximum allowable temperature Tmax if the discharge current of the discharge-needed cell is reduced by setting the duty ratio to a value less than 100% for the proportion that the discharge-needed cell discharge electric power W2 exceeded the discharge predetermined electric power W1. Therefore, the duty ratio which is necessary to perform a cell balance control so that the substrate temperature Ta does not exceed the maximum allowable temperature Tmax is represented by the ratio (W1/W2) between the discharge predetermined electric power W1 and the discharge-needed cell discharge electric power W2.

In other words, the duty control unit Mc of the microcomputer M computes the duty ratio Dy (step S5) based on the following equation <3> including the discharge predetermined electric power W1 and the discharge-needed cell discharge electric power W2. The duty control unit Mc performs a duty control of the switching element of the bypass circuit connected to the discharge-needed cell with the computed duty ratio Dy (step S6). Incidentally, as shown in the following equation <3>, when the discharge-needed cell discharge electric power W2 is smaller than the discharge predetermined electric power W1, the duty ratio Dy exceeds 100%. In such a case, the duty ratio Dy may be constantly set to 100%.

$$Dy = (W1/W2) \times 100 \qquad <3>$$

Figure 3:
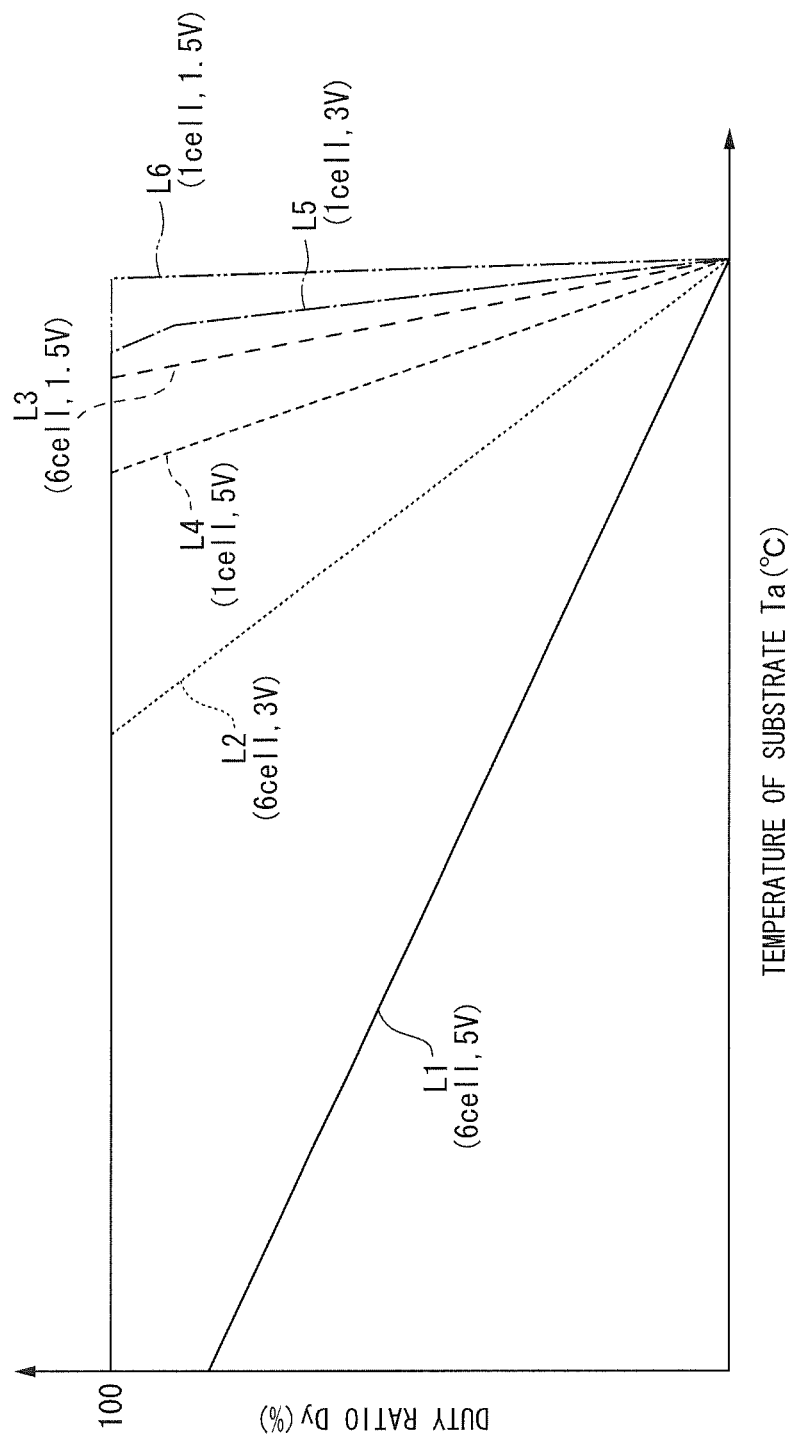
FIG. 3 is a characteristic diagram showing a relationship between a temperature Ta of a substrate and a duty ratio Dy.

FIG. 3 is a Ta-Dy characteristic diagram showing a relationship between the substrate temperature Ta and the duty ratio Dy. Incidentally, in FIG. 3, the reference numeral L1 represents a Ta-Dy characteristic line when the number of discharge-needed cells is six and the cell voltage is 5V, the reference numeral L2 represents a Ta-Dy characteristic line when the number of discharge-needed cells is six and the cell voltage is 3V, L3 represents a Ta-Dy characteristic line when the number of discharge-needed cells is six and the cell voltage is 1.5V, L4 represents a Ta-Dy characteristic line when the number of discharge-needed cell is one and the cell voltage is 5V, L5 represents a Ta-Dy characteristic line when the number of the number of discharge-needed cell is one and the cell voltage is 3V, and L6 represents a Ta-Dy characteristic line when the number of discharge-needed cell is one and the cell voltage is 1.5V. As shown in FIG. 3, the duty ratio Dy is set to become lower as at least one of the parameters for the substrate temperature Ta, the number of discharge-needed cells, and the cell voltage Vi increase(s).

Due to the cell balance control performed by the microcomputer M, the discharge-needed cell discharges. As a result, the cell balance of each of the cells C1 to C12 (the uniformity among the cell voltage) is maintained. At the same time, the substrate temperature Ta is restrained to be less than or equal to the maximum allowable temperature Tmax. Incidentally, while the cell balance control described above is being performed, the microcomputer M transmits to the battery ECU 2, a cell voltage of each of the cells C1 to C12 obtained by the cell voltage detection circuit D1 to D12 at a constant period. The duty control of the switching element is completed when a discharge termination order is received by the battery ECU 2 (i.e., when the cell balance is achieved).

As described above, according to the cell balance control device 1 based on the above embodiment, the substrate temperature Ta may be restrained to be less than or equal to the maximum allowable temperature Tmax while performing a cell balance control. Therefore, it is possible to prevent malfunctions and destructions of circuit elements occurring due to an increase in the substrate temperature Ta. In this way, it is possible to maintain an appropriate cell balance control.

The present invention is not limited to the embodiment described above. The following modifications may be made.

In the above embodiment, the example presented was a cell balance control device 1 which performs a cell balance control for the twelve cells C1 to C12. However, the number of cells that are to be controlled is not limited to twelve. In addition, for example, when a battery is configured by 45 cells connected in series, four cell balance control devices 1 may be used to perform a cell balance control for all of the cells included in the battery.

In the above embodiment, the substrate temperature Ta detected by the temperature sensor TS was directly used to compute the discharge predetermined electric power W1. However, when a correction of the temperature is necessary, the discharge predetermined electric power W1 may be computed by using a substrate temperature Ta' after the correction is made. Further, according to the above embodiment, the duty ratio Dy obtained by the equation <3> was directly used to perform a duty control of the switching element. However, it is preferably to multiply the duty ratio Dy with a correction coefficient in order to correct the nonlinearity between the discharge predetermined electric power W1 and the discharge-needed cell discharge electric power W2.

In the above embodiment, an example was given in which the cell balance control device 1 obtains an identification result of the discharge-needed cell from the battery ECU 2. However, it is possible to provide to the microcomputer M, a feature such that the discharge-needed cell is identified based on the cell voltage of each of the cells C1 to C12 obtained from the cell voltage detection circuit D1 to D12.

In the above embodiment, an example was given in which the equation <2> is used to compute the discharge-needed cell discharge electric power W2 consumed by the bypass circuit connected to the charge-needed cell. However, it is not necessary to compute the discharge-needed cell discharge electric power W2 by assuming that the duty ratio is 100%. When a duty control is performed at a duty ratio of 90% or 80% and the like, the total amount of discharge electric power consumed by the bypass circuit may be obtained as the discharge-needed cell discharge electric power W2.

While a preferred embodiment of the present invention has been described above with reference to the attached figures, it should be noted that these are exemplary of the invention and are not to be considered as limiting the present invention. Additions, omissions, substitutions, and other modifications can be made without departing from the scope of the present invention.

What is claimed is:

1. A cell balance control device comprising:
a plurality of bypass circuits, the bypass circuit comprising a direct circuit with a bypass resistance and a switching element, the plurality of bypass circuits being connected in parallel to each of a plurality of cells comprised in a battery;
a cell voltage detection unit detecting a cell voltage of each of the plurality of cells;
a temperature detection unit detecting a temperature of a substrate on which the bypass circuit is mounted; and
a control unit controlling and computing a duty ratio of the switching element based on a value detected by the temperature detection unit and a cell voltage of a discharge-needed cell obtained by the cell voltage detection unit.

2. The cell balance control device according to claim 1, wherein the control unit comprises a discharge predetermined electric power calculation unit, a discharge-needed cell discharge electric power calculation unit, and a duty control unit, wherein:
based on the value detected by the temperature detection unit, the discharge predetermined electric power calculation unit computes a discharge predetermined electric power necessary for increasing the temperature of the substrate to a maximum allowable temperature;
based on the cell voltage of the discharge-needed cell, the discharge-needed cell discharge electric power calculation unit computes a discharge-needed cell discharge electric power consumed by a bypass circuit connected to the discharge-needed cell; and
the duty control unit computes a duty ratio based on the discharge predetermined electric power and the discharge-needed cell discharge electric power, and uses this duty ratio to perform a duty control of the switching element of the bypass circuit connected to the discharge-needed cell.

3. The cell balance control device according to claim 2, wherein the discharge predetermined electric power calculation unit computes the discharge predetermined electric power based on a following equation (1)

$$W1=(Tmax-Ta)/Rth \qquad (1),\text{wherein}$$

W1 represents the discharge predetermined electric power, Tmax represents the maximum allowable temperature, Ta represents the temperature of the substrate, and Rth represents a thermal resistance of the substrate.

4. The cell balance control device according to claim 2, wherein the discharge-needed cell discharge electric power calculation unit computes the discharge-needed cell discharge electric power W2 based on a following equation (2)

$$W2=\Sigma(Vi^2/r) \qquad (2),\text{wherein}$$

W2 represents the discharge-needed cell discharge electric power, Vi represents the cell voltage of the discharge-needed cell, i represents an identification number of the discharge-needed cell, and r represents a sum of the resistances of the plurality of bypass circuits.

5. The cell balance control device according to claim 2, wherein the duty control unit computes the duty ratio based on a following equation (3)

$$Dy=(W1/W2)\times 100 \qquad (3),\text{wherein}$$

Dy represents the duty ratio, W1 represents the discharge predetermined electric power, and W2 represents the discharge-needed cell discharge electric power.

6. The cell balance control device according to claim 1, wherein the control unit transmits to an upper level control device, each of the cell voltage of the plurality of cells obtained by the cell voltage detection unit, and receives from the upper level control device, an identification result of the discharge-needed cell.

* * * * *